US012681924B2

(12) United States Patent
Gao et al.

(10) Patent No.: US 12,681,924 B2
(45) Date of Patent: Jul. 14, 2026

(54) COMMUNICATION NETWORK DATA MANAGEMENT AND VISUALIZATION USING GENERATIVE LARGE LANGUAGE MODEL-BASED QUERY STATEMENT GENERATION

(71) Applicant: AT&T Intellectual Property I, L.P., Atlanta, GA (US)

(72) Inventors: Chunhua Gao, Freehold, NJ (US); Xinsheng Xia, Holmdel, NJ (US); Isilay Baran, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/757,347

(22) Filed: Jun. 27, 2024

(65) Prior Publication Data

US 2026/0003859 A1     Jan. 1, 2026

(51) Int. Cl.
*G06F 16/24*      (2019.01)
*G06F 16/242*     (2019.01)
*G06F 16/248*     (2019.01)

(52) U.S. Cl.
CPC .......... *G06F 16/243* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 2020/0034362 A1* | 1/2020 | Galitsky | G06F 40/247 |
| 2021/0232613 A1* | 7/2021 | Raval Contractor | G06N 5/02 |
| 2021/0294970 A1* | 9/2021 | Bender | G06N 5/022 |
| 2023/0169527 A1* | 6/2023 | Morningstar | G06N 5/022 |
| | | | 705/7.32 |
| 2024/0281222 A1* | 8/2024 | Trummer | G06F 8/35 |
| 2024/0330279 A1* | 10/2024 | Truong | G06F 16/2428 |
| 2024/0411746 A1* | 12/2024 | Shu | G06N 3/0475 |
| 2025/0005028 A1* | 1/2025 | Merchant | G06N 20/00 |
| 2025/0077897 A1* | 3/2025 | Kalukin | G06N 5/04 |

* cited by examiner

*Primary Examiner* — Augustine K. Obisesan

(57) ABSTRACT

A processing system including at least one processor may obtain a natural language request associated with a database system and may generate a prompt based upon the natural language request in accordance with a prompt mapping function. The processing may next apply the prompt as an input to a generative model to generate a structured query and may further apply the structured query to the database system to obtain a query result. The processing system may then present at least one visualization of the query result.

20 Claims, 5 Drawing Sheets

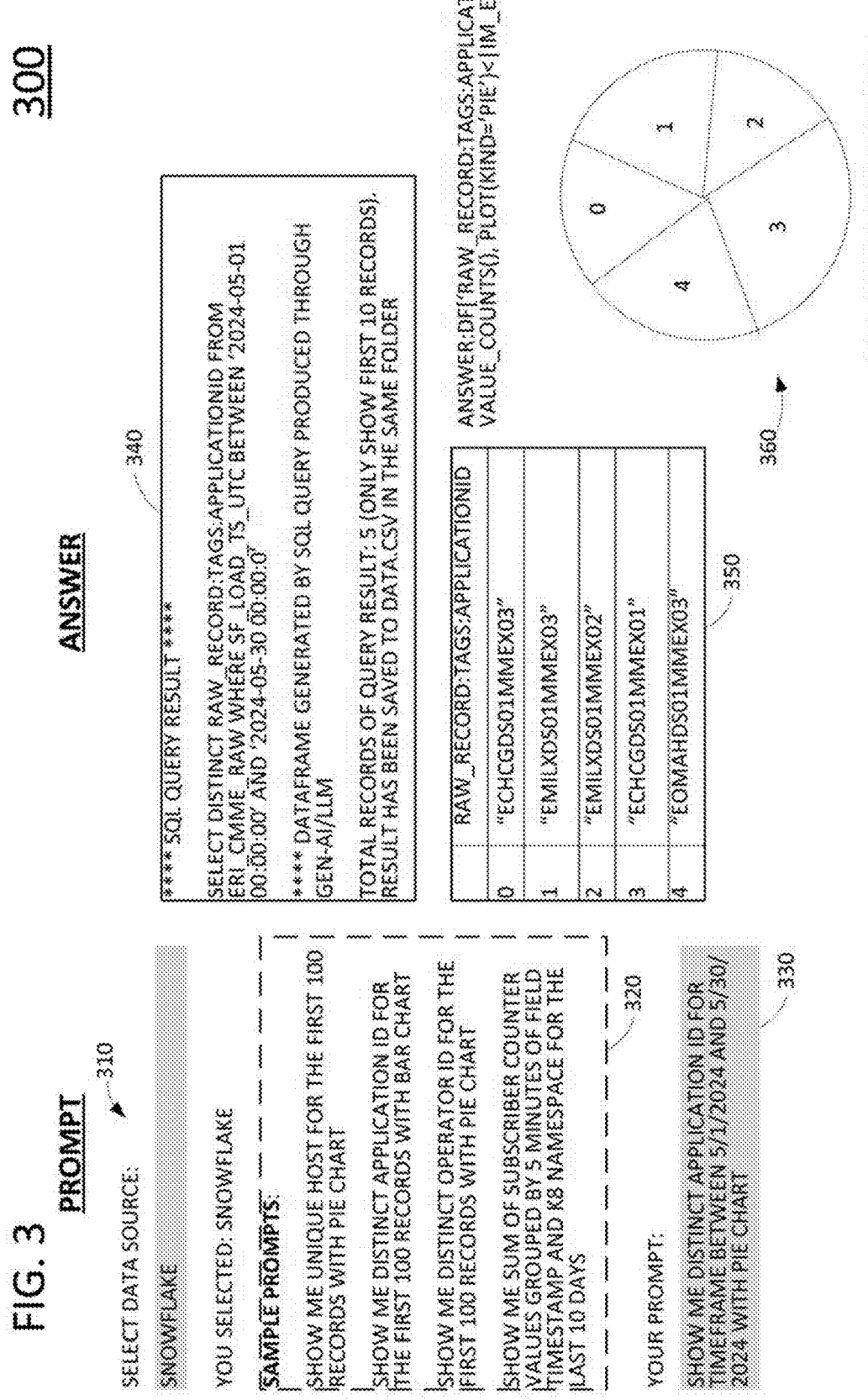

PROMPT 310

SELECT DATA SOURCE:

SNOWFLAKE

YOU SELECTED: SNOWFLAKE

SAMPLE PROMPTS:

SHOW ME UNIQUE HOST FOR THE FIRST 100 RECORDS WITH PIE CHART

SHOW ME DISTINCT APPLICATION ID FOR THE FIRST 100 RECORDS WITH BAR CHART

SHOW ME DISTINCT OPERATOR ID FOR THE FIRST 100 RECORDS WITH PIE CHART

SHOW ME SUM OF SUBSCRIBER COUNTER VALUES GROUPED BY 5 MINUTES OF FIELD TIMESTAMP AND K8 NAMESPACE FOR THE LAST 10 DAYS

320

YOUR PROMPT:

SHOW ME DISTINCT APPLICATION ID FOR TIMEFRAME BETWEEN 5/1/2024 AND 5/30/2024 WITH PIE CHART

330

ANSWER 340

*** SQL QUERY RESULT ***

SELECT DISTINCT RAW_RECORD:TAGS:APPLICATIONID FROM ERI_CMME_RAW WHERE SF_LOAD_TS_UTC BETWEEN '2024-05-01 00:00:00' AND '2024-05-30 00:00:0'

***** DATAFRAME GENERATED BY SQL QUERY PRODUCED THROUGH GEN-AI/LLM

TOTAL RECORDS OF QUERY RESULT 5 (ONLY SHOW FIRST 10 RECORDS). RESULT HAS BEEN SAVED TO DATA.CSV IN THE SAME FOLDER

| | RAW_RECORD:TAGS:APPLICATIONID |
|---|---|
| 0 | "ECHCGDS01MMEX03" |
| 1 | "EMILXDS01MMEX03" |
| 2 | "EMILXDS01MMEX02" |
| 3 | "ECHCGDS01MMEX01" |
| 4 | "EOMAHDS01MMEX03" |

350

ANSWER:DF[['RAW_RECORD:TAGS:APPLICATIONID'], VALUE_COUNTS(), PLOT(KIND='PIE')<|IM_END|>

360

RAW_RECORD:TAGS:APPLICATIONID

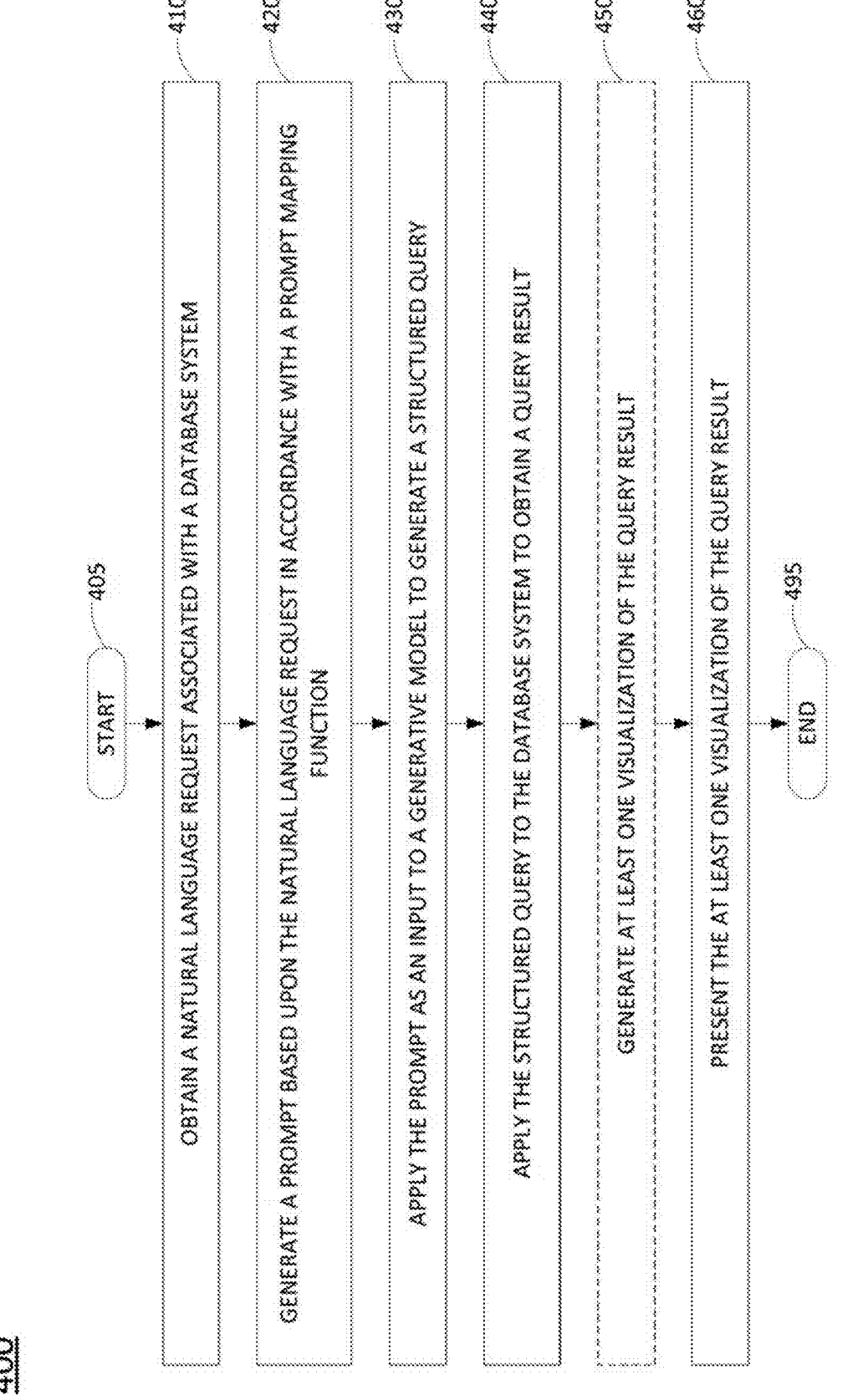

400

START 405

410 OBTAIN A NATURAL LANGUAGE REQUEST ASSOCIATED WITH A DATABASE SYSTEM

420 GENERATE A PROMPT BASED UPON THE NATURAL LANGUAGE REQUEST IN ACCORDANCE WITH A PROMPT MAPPING FUNCTION

430 APPLY THE PROMPT AS AN INPUT TO A GENERATIVE MODEL TO GENERATE A STRUCTURED QUERY

440 APPLY THE STRUCTURED QUERY TO THE DATABASE SYSTEM TO OBTAIN A QUERY RESULT

450 GENERATE AT LEAST ONE VISUALIZATION OF THE QUERY RESULT

460 PRESENT THE AT LEAST ONE VISUALIZATION OF THE QUERY RESULT

END 495

COMMUNICATION NETWORK DATA MANAGEMENT AND VISUALIZATION USING GENERATIVE LARGE LANGUAGE MODEL-BASED QUERY STATEMENT GENERATION

The present disclosure relates generally to communication network operations, and more specifically to methods, computer-readable media, and apparatuses for presenting a visualization of a query result obtained in response to an input prompt generated from a natural language request in accordance with a prompt mapping function.

BACKGROUND

A large communication network may collect and process a substantial volume of data generated by devices/systems. Such data may be primarily maintained in database tables, e.g., in a structured query language (SQL) or no-SQL format. In addition, tables, or rows and columns thereof may be associated or linked to one another to maintain additional knowledge in a graph database, and so forth.

SUMMARY

The present disclosure describes methods, computer-readable media, and apparatuses for presenting a visualization of a query result obtained in response to an input prompt generated from a natural language request in accordance with a prompt mapping function. For instance, in one example, a processing system including at least one processor may obtain a natural language request associated with a database system and may generate a prompt based upon the natural language request in accordance with a prompt mapping function. The processing may next apply the prompt as an input to a generative model to generate a structured query and may further apply the structured query to the database system to obtain a query result. The processing system may then present at least one visualization of the query result.

BRIEF DESCRIPTION OF THE DRAWINGS

The present disclosure can be readily understood by considering the following detailed description in conjunction with the accompanying drawings, in which:

FIG. 3 illustrates an example user interface for automated structured query generation and output visualization in accordance with the present disclosure;

FIG. 4 illustrates a flowchart of an example method for presenting a visualization of a query result obtained in response to an input prompt generated from a natural language request in accordance with a prompt mapping function.

To facilitate understanding, identical reference numerals have been used, where possible, to designate identical elements that are common to the figures.

DETAILED DESCRIPTION

Figure 1:
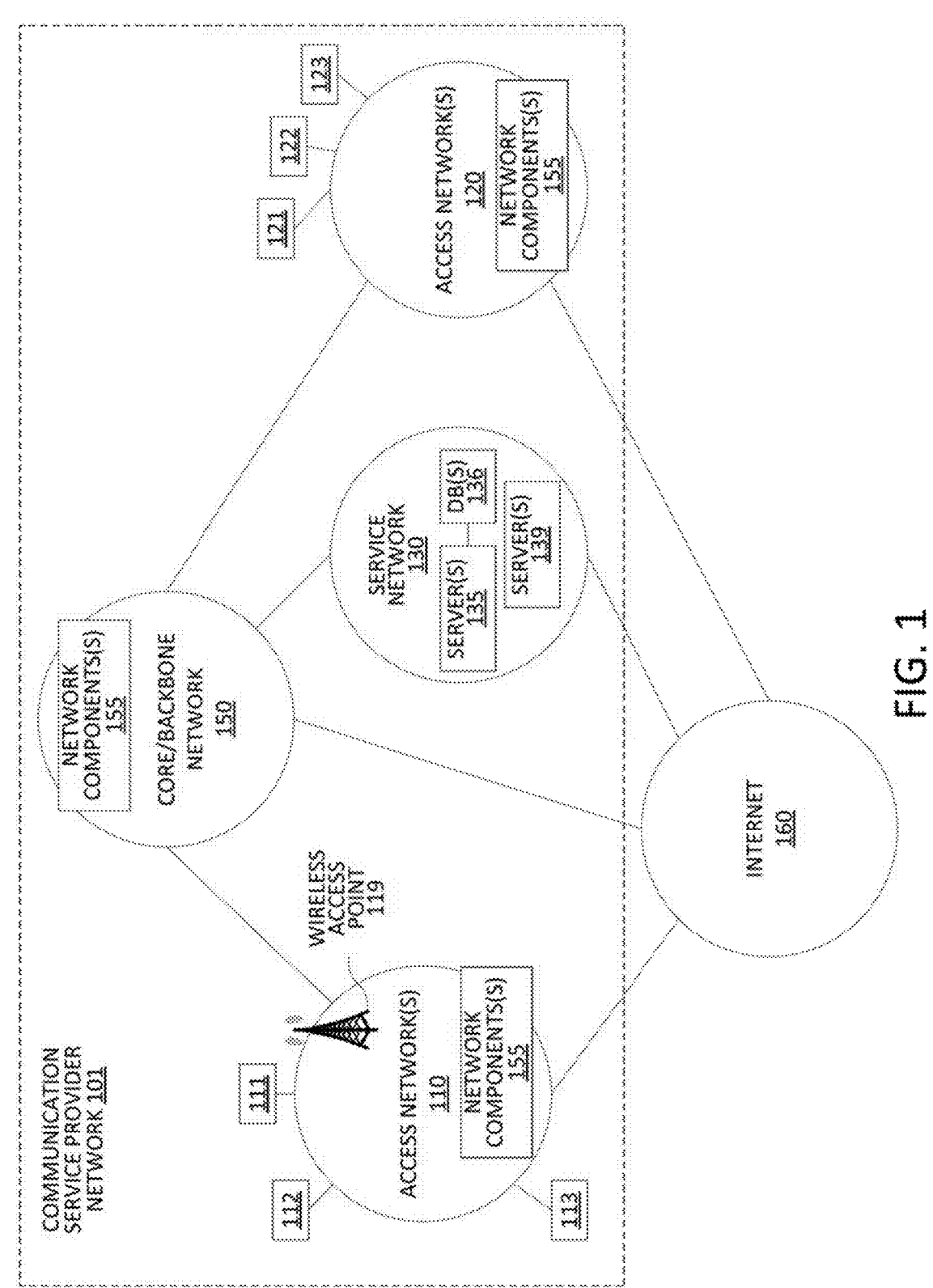
FIG. 1 illustrates an example of a system related to the present disclosure.

The present disclosure broadly discloses methods, non-transitory (i.e., tangible or physical) computer-readable media, and apparatuses for presenting a visualization of a query result obtained in response to an input prompt generated from a natural language request in accordance with a prompt mapping function. In particular, examples of the present disclosure ingest natural language requests/prompts and generate structured queries, or query statements, using generative artificial intelligence (AI) and/or machine learning (ML) (collectively referred to as generative AI, or genAI). In addition, examples of the present disclosure may process these generated structured queries to obtain query results, and may further generate one or more visualizations for display/presentation based upon the query results. Notably, legacy databases may be migrated to new platforms, e.g., cloud/network-based platforms, such as Snowflake, etc. In addition, more complex and/or new formats of data storage, such as Java Script Object Notation (JSON) or the like are increasing being deployed. Typical communication network operation workflows may include querying a database to generate business reports or charts for analysis, forecast, etc. This may involve significant time and effort for a user to manually construct a structured query/query statement.

Examples of the present disclosure may standardize database queries and output visualization processes using machine learning and generative artificial intelligence request/prompt enhancement as described herein. Examples of the present disclosure thus simplify network operations, e.g., eliminating complex, manual structured query construction. For instance, a user may obtain structured query-accessible data, and may have charts, graphs, or other visualizations generated and displayed based upon a human language request/prompt pertaining to data in a network database system. In other words, a user without skills in Structured Query Language (SQL) or the like may easily perform queries by natural language (e.g., text and/or voice) request. In addition, examples of the present disclosure may reduce time and efforts to learn existing database and visualization system languages, protocols, etc. and/or to develop new query and visualization tools.

To further illustrate, examples of the present disclosure may provide for flexible choice of source database(s), data tables, etc. For instance, in one example, the present disclosure may provide an option to select Snowflake or comma-separated value (CSV) file formats, or other types of stored data. In one example, the present disclosure may be configured to work with different databases and/or database types, different roles, different data lakes or data warehouses, different schemas, different tables and/or table view, and so on. In any case, the present disclosure may then provide for automatic structured query generation from human text request/prompt. In one example, the present disclosure my further provide for selection (e.g., via natural language as part of the initial request/prompt, or following obtaining a structured query result), generation, and display/presentation of a particular type of visualization (e.g., a chart or graph such as a bar graph, a pie graph/chart, a line graph, etc., a print out or display on a screen of the query results in a table format, and so forth).

In addition, examples of the present disclosure may comprise additional features of, or may otherwise be integrated with an AI/ML virtual assistant or knowledge base associated with a communication network. In one example, AL/ML elements of the present disclosure may be trained/ updated on an ongoing basis via self-training/learning for optimized structured query generation, e.g., via user feedback or other feedback. In one example, recent requests, enhanced prompts, and/or generated structured queries may be stored along with corresponding query results for streamlined response for repeat requests/queries.

As such, examples of the present disclosure reduce development time and effort compared to existing applications. In addition, users may obtain query results and visualizations with little to no learning to operate a complex database system. It is again noted that a human language request from a user may be the only requisite input in order for the present disclosure to process and obtain an SQL query result and/or a visualization based on such a result. Even for a user versed in one or more query language (such as SQL, etc.), examples of the present disclosure may still save the user's time and effort to construct structured queries. In addition, in various examples, the present disclosure may be implemented using the current and/or future tools and technologies, such as using a LangChain framework with Snowflake application programming interface (API), openAl large language model (s) (LLM(s)), Streamlit user interface (UI) implementation, and so forth. In one particular example, multiple data sources and/or JSON format columns from Snowflake may be supported. These and other aspects of the present disclosure are discussed in greater detail below in connection with the examples of FIGS. 1-5.

To aid in understanding the present disclosure, FIG. 1 illustrates an example system 100 comprising a plurality of different networks in which examples of the present disclosure may operate. Communication service provider network 101 may comprise a core network and/or backbone network 150 with components for telephone services, Internet services, and/or video services (e.g., triple-play services, etc.) that are provided to customers (broadly "subscribers"), and to peer networks. In one example, core/backbone network 150 may combine core network components of a cellular network with components of a triple-play service network. For example, communication service provider network 101 may functionally comprise a fixed-mobile convergence (FMC) network, e.g., an IP Multimedia Subsystem (IMS) network. In addition, core/backbone network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Communication service provider network 101 may also further comprise a broadcast video network, e.g., a cable television provider network or an Internet Protocol Television (IPTV) network, as well as an Internet Service Provider (ISP) network. With respect to video/television service provider functions, core/backbone network 150 may include one or more video servers for the delivery of video content, e.g., a broadcast server, a cable head-end, a video-on-demand (VoD) server, and so forth. For example, core/backbone network 150 may comprise a video super hub office, a video hub office and/or a service office/central office.

In one example, access networks 110 and 120 may each comprise a Digital Subscriber Line (DSL) network, a broadband cable access network, a Local Area Network (LAN), a cellular or non-cellular wireless access network, and the like. For example, access networks 110 and 120 may transmit and receive communications between endpoint devices 111-113, endpoint devices 121-123, and service network 130, and between core/backbone network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. + In another example, one or both of the access networks 110 and 120 may comprise an ISP network external to communication service provider network 101, such that endpoint devices 111-113 and/or 121-123 may communicate over the Internet 160, without involvement of the communication service provider network 101. Endpoint devices 111-113 and 121-123 may each comprise customer premises equipment (CPE), user equipment (UE), and/or other endpoint device types, such as a telephone, e.g., for analog or digital telephony, a mobile device, such as a cellular smart phone, a laptop, a tablet computer, etc., a router (e.g., a customer edge (CE) router), a gateway, a desktop computer, a plurality or cluster of such devices, a television (TV), e.g., a "smart" TV, or a set-top box (STB).

In one example, the access networks 110 and 120 may be different types of access networks. In another example, the access networks 110 and 120 may be the same type of access network. In one example, one or more of the access networks 110 and 120 may be operated by the same or a different service provider from a service provider operating the communication service provider network 101. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where core/backbone network 150 may provide cellular core network functions, e.g., of a public land mobile network (PLMN)-universal mobile telecommunications system (UMTS)/General Packet Radio Service (GPRS) core network, or the like. For instance, access network(s) 110 may include at least one wireless access point (AP) 119, e.g., a cellular base station, such as an eNodeB, or gNB, a non-cellular wireless access point (AP), such as an Institute of Electrical and Electronics Engineers (IEEE) 802.11 (Wi-Fi) access point, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home or enterprise gateway and/or router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, communication service provider network 101 may also include one or more network components 155 (e.g., in core/backbone network 150 and/or access network (s) 110 and 120). Network components 155 may include various physical components of communication service provider network 101. For instance, network components 155 may include various types of optical network equipment, such as an optical network terminal (ONT), an optical network unit (ONU), an optical line amplifier (OLA), a fiber distribution panel, a fiber cross connect panel, and so forth. Similarly, network components 155 may include various types of cellular network equipment, such as a mobility management entity (MME), a mobile switching center (MSC), an eNodeB, a gNB, a base station controller (BSC), a baseband unit (BBU), a remote radio head (RRH), an antenna system controller, and so forth. In one example, network components 155 may alternatively or additionally include voice communication components, such as a call server, an echo cancellation system, voicemail equipment, a private branch exchange (PBX), etc., short message service (SMS)/text message infrastructure, such as an SMS gateway, a short message service center (SMSC), or the like, video distribution infrastructure, such as a media server (MS), a video on demand (VoD) server, a content distribution node (CDN), and so forth. Network components 155 may further include various other types of communication network equipment such as a layer 3 router, e.g., a provider edge (PE) router, an integrated services router, etc., an Internet exchange point (IXP) switch, and so on. In one example, network components 155 may further include virtual components, such as a virtual machine (VM), a virtual container, etc., software defined network (SDN) nodes, such as a virtual mobility management entity (vMME), a virtual serving gateway (vSGW), a virtual network address translation (NAT) server, a virtual firewall server, or the like, and so forth. In addition, for ease of illustration, various components of communication service provider network 101 are omitted from FIG. 1.

Still other network components 155 may include a database of assigned telephone numbers, a database of basic customer account information for all or a portion of the customers/subscribers of the communication service provider network 150, a cellular network service home location register (HLR), e.g., with current serving base station information of various subscribers, and so forth, a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other network components 155 may include, for example, a layer 3 router, a short message service (SMS) server, a voicemail server, a video-on-demand server, a server for network traffic analysis, a database server/database system, and so forth. It should be noted that in one example, a communication network component may be hosted on a single server, while in another example, a communication network component may be hosted on multiple servers, e.g., in a distributed manner.

In accordance with the present disclosure, network components 155 may comprise "network resources" of various network resource types, which may also include services provided and/or hosted via network components 155, e.g., enterprise communication services, such as a virtual private network (VPN) service, a virtual local area network (VLAN) service, a Voice over Internet Protocol (VoIP), a software defined-wide area network (SD-WAN) service, an Ethernet wide area network E-WAN service, and so forth. Alternatively, or in addition, network resources may include interfaces or ports associated with such services, such as a customer edge (CE) router or PBX-to-time division multiplexing (TDM) gateway interface, a Border Gateway Protocol (BGP) interface (e.g., between BGP peers), and so forth. For instance, a CE router, PBX, or the like may be homed to one or several provider edge (PE) routers or other edge component(s).

In one example, the service network 130 may comprise a local area network (LAN), or a distributed network connected through permanent virtual circuits (PVCs), virtual private networks (VPNs), and the like for providing data and voice communications. In one example, the service network 130 may comprise one or more devices for providing services to subscribers, customers, and/or users. For example, communication service provider network 101 may provide a cloud storage service, web server hosting, and other services. As such, service network 130 may represent aspects of communication service provider network 101 where infrastructure for supporting such services may be deployed. In one example, the service network 130 may alternatively or additionally comprise one or more devices supporting operations and management of communication service provider network 101. For instance, in the example of FIG. 1, server(s) 139 may include higher level services/applications such as a database of assigned telephone numbers, a database of basic customer account information for all or a portion of the customers/subscribers of the communication service provider network 101, a billing system, a customer relationship management (CRM) system, a trouble ticket system, an ordering system, an enterprise reporting system (ERS), an account object (AO) database system, a network inventory system, a network provisioning system, a unified data repository (UDR), and so forth. In one example, server(s) 139 may alternatively or additionally comprise one or more of the types of network components 155 described above.

In addition, service network 130 may include one or more servers 135 which may each comprise all or a portion of a computing device or system, such as computing system 500, and/or processing system 502 as described in connection with FIG. 5 below, specifically configured to perform various steps, functions, and/or operations for presenting a visualization of a query result obtained in response to an input prompt generated from a natural language request in accordance with a prompt mapping function, as described herein. For example, one of the server(s) 135, or a plurality of the servers 135 collectively, may perform operations in connection with the example method 400, or as otherwise described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in connection with examples of the present disclosure. For example, DB(s) 136 may be configured to receive and store network operational data, including information on the type(s) of network resources, utilization and/or availability levels of such network resources, configuration settings and/or parameters of such network resources, alarm data, and so forth. It should be noted that some or all of such information may be contained in other network databases/systems, such as one or more of an active and available inventory (A&AI) database, a network inventory database, a call detail records (CDR) repository, or the like (e.g., represented by server(s) 139 and/or various network components 155). Alternatively, or in addition, DB(s) 136 may be configured to receive and store customer/subscriber network resource order information (e.g., an additional type or types of network operational data), such as the subscriber/customer identities and other characteristics (e.g., a customer intensity value and/or a customer segment as described herein), the timing of such orders, the quantities of such orders, the type of service(s) ordered, and so forth. Similar to the above, some or all of such information may be contained in other network databases/systems, such as one or more of an authentication, authorization, and accounting (AAA) server/system, an operations support system (OSS), a business support system (BSS), a unified data repository (UDR), or the like.

It should be noted that in accordance with the present disclosure, the network operational data stored in DB(s) 136 or elsewhere may be maintained over a period of time. For instance, DB(s) 136 may store respective time series data indicative of different utilization and/or assignment levels of various network resources of various types in a given time interval (and over a period of a plurality of time intervals), etc. In one example, data may be segregated by customer segment, network zone, geographic region, and so forth.

In one example, DB(s) 136 may alternatively or additionally receive and store data from one or more external data feeds. For instance, DB(s) 136 may receive and store weather data from a device of a third-party, e.g., a weather service, a traffic management service, etc. via one of the access networks 110 or 120. To illustrate, one of endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties, which can then be correlated to network traffic data to reflect impact of various weather conditions on overall network traffic. In still another example, one of the endpoint devices 111-113 or 121-123 may represent a server of a traffic management service (e.g., for vehicular traffic) and may forward various traffic related data to DB(s) 136, such as toll payment data, records of traffic volume estimates, traffic signal timing information, and so forth. Similarly, one of the endpoint devices 111-113 or 121-123 may represent a server of a consumer credit entity (e.g., a credit bureau, a credit card company, etc.), a merchant, or the like. In such an example, DB(s) 136 may obtain one or more data sets/data feeds comprising information such as: consumer credit scores, credit reports, purchasing information and/or credit card payment information, credit card usage location information, and so forth. In one example, aspects of the abovementioned data may be stored in user, subscriber, and/or account profiles, which may include account owner biographic information, such as individual or entity name, address, phone number(s), device identifier(s), authorized users, age(s), service history, payment history, payment methods, communication preferences, privacy preferences, and so forth. In other words, some of the abovementioned data types may be stored in or linked to respective user/account profiles, or the like.

In one example, DB(s) 136 may also store artificial intelligence (AI) models and/or machine learning models (MLMs) that may be trained by, activated, and/or deployed by server(s) 135 in connection with examples of the present disclosure. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. In one example, the one or more of the servers 135 and/or server(s) 135 in conjunction with DB(s) 136 may comprise a generative MLM-based communication network knowledge platform (e.g., a network-based and/or cloud-based service hosted on the hardware of server(s) 135 and/or DB(s) 136).

It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like). In one example, one or more MLMs of the present disclosure may include supervised learning and/or reinforcement learning (e.g., using positive and negative examples after deployment as a MLM), and so forth. In one example, MLAs/MLMs of the present disclosure may be in accordance with an open source library, such as OpenCV, which may be further enhanced with domain-specific training data.

In one example, MLMs of the present disclosure may include an ML-based generative model, such as a language model, e.g., a "large language model" (LLM). For instance, an ML-based generative model used in the present examples may comprise a generative adversarial network (GAN), a bidirectional encoder representations from transformers (BERT) model (e.g., BERT-Base, BERT-Large, etc.), a generative pre-training (GPT) model (e.g. GPT, GPT-2, GPT-3, or the like), a semantic graphs-based pre-training (SGPT) model, or other generative natural language processing (NLP) models. In one example, MLMs of the present disclosure may comprise an ada text embedding model.

As noted above, server(s) 135 may be configured to perform various steps, functions, and/or operations for presenting a visualization of a query result obtained in response to an input prompt generated from a natural language request in accordance with a prompt mapping function, as described herein. For instance, an example method for presenting a visualization of a query result obtained in response to an input prompt generated from a natural language request in accordance with a prompt mapping function is illustrated in FIG. 4 and described in greater detail below. To further illustrate, server(s) 135 may obtain a natural language request associated with a database system, e.g., comprising network operational data. For example, server(s) 135 may comprise a generative MLM-based communication network knowledge platform that may be used by network personnel for network operations and management, network troubleshooting and mainte-nance, network planning, and so forth. As such, the network operational data may include various data stored in DB(s) 136 or elsewhere, such as network performance indicator data, configurable setting values for one or more network settings e.g., KPIs or other measurements self-reported by devices or measured by other entities within the network, network inventory data, customer/subscriber account data, and so forth. Server(s) 135 may next generate a prompt based upon the natural language request in accordance with a prompt mapping function, as described in greater detail below. Server(s) 135 may further apply the prompt as an input to a generative model, e.g., implemented by server(s) 135, to generate a structured query. Server(s) 135 may then apply the structured query to the database system (e.g., represented by at least a portion of DB(s) 136, network component(s) 155, etc.) to obtain a query result, and may present at least one visualization of the query result. For instance, the at least one visualization may include a result table, a graph, a chart, or the like. Servers(s) 135 may alternatively or additionally perform various operations as described in connection with FIGS. 2-5, or elsewhere herein.

In addition, it should be realized that the system 100 may be implemented in a different form than that illustrated in FIG. 1, or may be expanded by including additional end-point devices, access networks, network elements, applica-tion servers, etc. without altering the scope of the present disclosure. As just one example, any one or more of the server(s) 135 and DB(s) 136 may be distributed at different locations, such as in or connected to access networks 110 and 120, in another service network connected to Internet 160 (e.g., a cloud computing provider), in core/backbone network 150, and so forth. Thus, these and other modifica-tions are all contemplated within the scope of the present disclosure.

Figure 2:
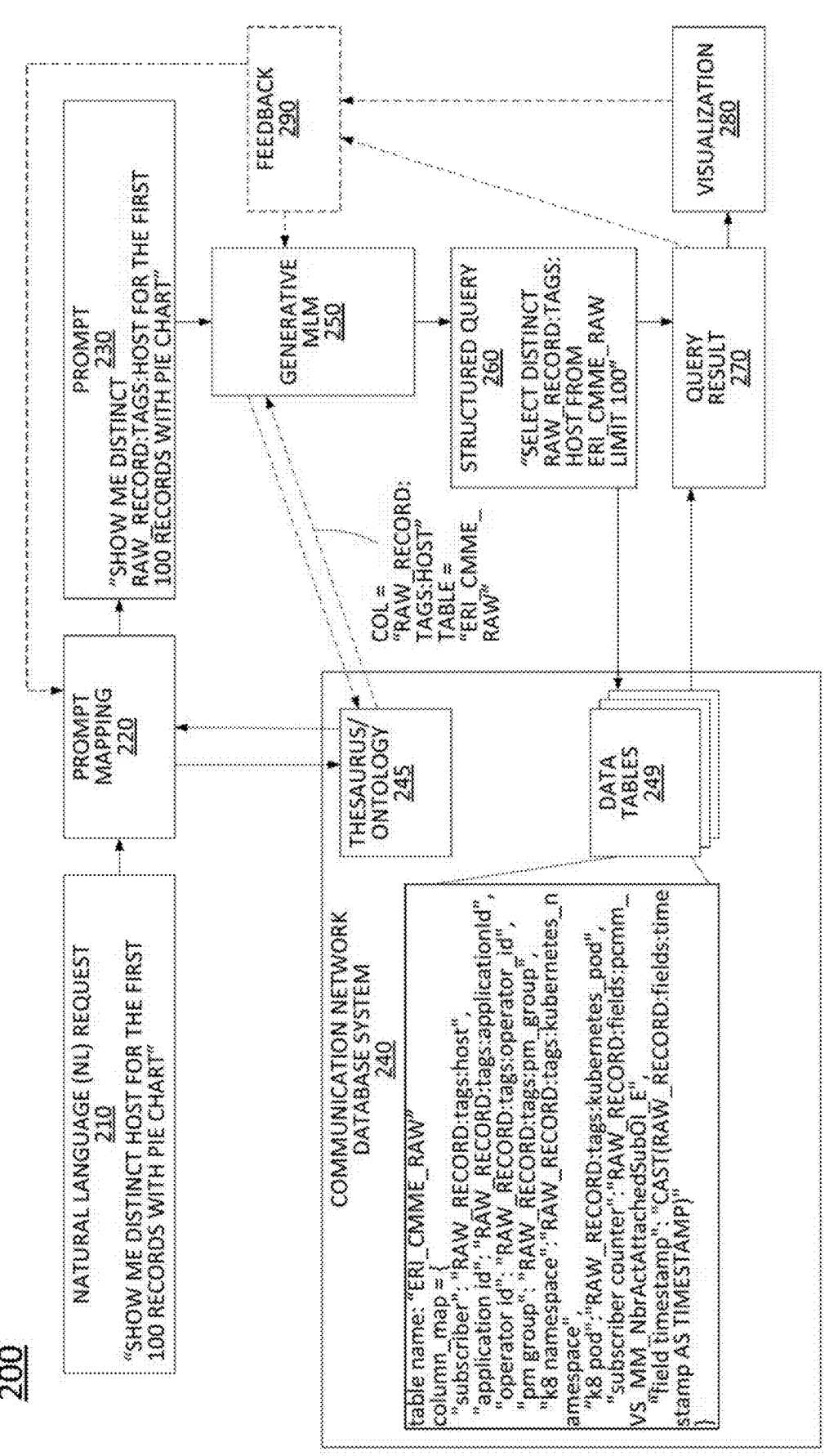
FIG. 2 illustrates an example process for presenting a visualization of a query result obtained in response to an input prompt generated from a natural language request in accordance with a prompt mapping function, in accordance with the present disclosure.

FIG. 2 illustrates an example process 200 for presenting a visualization of a query result obtained in response to an input prompt generated from a natural language request in accordance with a prompt mapping function, in accordance with the present disclosure. In particular, the process 200 may be implemented by a generative MLM-based commu-nication network knowledge platform, such as server(s) 135 of FIG. 1, or the like. As illustrated in FIG. 2, the process 200 may begin with a natural language (NL) request 210. For instance, an example NL request may be: "Show me distinct host for the first 100 records with pie chart." It should be noted that NL request 210 may also be considered or referred to as a "prompt." However, to disambiguate from other aspects of the present disclosure, the term "request" may primarily be used to refer to a user's NL input request-ing data and visualization, e.g., with respect to network operational data from communication network database system 240. Communication network database system 240 may comprise a data warehouse that stores data in different formats, such as comma separated values, JSON, and so forth. In the present example, communication network data-base system 240 may include a plurality of data tables 249. In addition, in one example, the communication network database system 240 may include a thesaurus/ontology 245, as described in greater detail below.

In one example, communication network database system 240 may comprise one or more structured query language (SQL) databases containing network operational data. For instance, the network operational data may include network troubleshooting data, configuration settings/parameters of various devices, systems, services, or the like in a commu-nication network, optimization and workflow data, cus-tomer/subscriber data, etc. It should be noted that the present examples of network operational data are provided by way of illustration only. Thus, it should be appreciated that examples of the present disclosure are not limited to any particular type of network operational data or sub-categori-zations of such network operational data.

As noted above, examples of the present disclosure may automatically generate and run SQL queries based upon NL requests. In one example, and as illustrated in the example process 200 of FIG. 2, the generative MLM-based commu-nication network knowledge platform may perform a prompt mapping 220 to create a prompt 230 to be used as an input/prompt for a generative model 250, e.g., a generative machine learning model (MLM). In particular, the prompt 230 may be particularized, e.g., optimized with respect to the communication network database system 240 and/or a knowledge base associated with communication network management and/or communication network operations, or the like. To illustrate, the prompt mapping 220 may include natural language processing (NLP) to map terms in the natural language request (e.g., more general/colloquial term) to terms that are optimized for a prompt input to a generative model in a subsequent phase (e.g., more technical terms for the same "concepts" and/or terms that are particularized to the terminology used in the communication network data-base system 240).

For instance, in one example, the prompt mapping 220 may utilize a mapping table maintained by the generative MLM-based communication network knowledge platform in which technical terms, or terms that are used in table columns and/or fields of data tables 294 of the communi-cation network database system 240 are mapped to corre-sponding informal terms. For instance, a column in one of the data tables 249 may be labeled as "host." However, the term "subscriber" may be more typically used by most users to refer the same concept. Accordingly, the mapping table may include a list of entries that associate these more commonly used words to the corresponding more technical terms. It should also be noted that in accordance with the present disclosure, the mapping may be particularized for handling JSON data. For instance, each entry in a JSON column of a data table 249 may include multiple fields. In some case, the number of fields may be in the hundreds or more, for example. The mapping table may therefore asso-ciate table column labels and/or the JSON field labels within corresponding informal terms.

In one example, the mapping table may be generated using domain knowledge, e.g., where an expert may map common words to more technical words that may be asso-ciated with columns, JSON fields, or the like. In one example, the generative MLM-based communication net-work knowledge platform may automatically adapt the mapping table to handle new data, e.g., new tables and/or columns. For instance, the mapping table may start with data tables 249 having columns and/or fields that are mapped with certain terms. Then as time progresses, new tables may be added to data tables 249 with new columns and/or fields that may be similar to other fields in one or more others of the data tables 249. As such, the generative MLM-based communication network knowledge platform may adapt the mapping to the new tables and the columns and/or fields therein. For instance, as new tables are added to data tables 249, network personnel may indicate certain fields in the new tables that may be the same as others in existing ones of data tables 249. Thus, even if different column and/or field labels are used, the mapping table may still map more informal terms used in natural language with the corresponding technical and/or domain-specific terms that may be used as column and/or field labels.

In one example, the generative MLM-based communication network knowledge platform may perform the prompt mapping 220 using a thesaurus/controlled vocabulary, or an ontology (e.g., thesaurus/ontology 245 of the communication network database system 240). For instance, the thesaurus/ontology 245 may comprise a feature graph database or "feature graph." For instance, the feature graph database may comprise an "ontology graph" that represents both lineage and nomenclature for "features" of the communication network database system 240 (e.g., tables, columns, and/or fields). For example, nodes may represent column and/or field labels. Edges/links may represent columns/fields that are the same or related, e.g., "is a subset of," "is derived from," etc. In one example, such an ontology graph may further include nodes for "natural language terms" and links/edges to other nodes representing the corresponding "technical terms," e.g., the actual field and/or column labels.

In one example, when introducing a new feature, e.g., as part of a new table to be added to data tables 249, checks may be made that it does not fall within an existing ontological entry (e.g., it may be a duplicate). In addition, when features (e.g., one or more new columns of one or more tables) are introduced into the communication network database system 240, the features may be associated with time blocks, or time ranges. A fingerprint service may compute a fingerprint for feature data that is in a prescribed time range. For example, fingerprints may include multiple aspects of information about a feature (e.g., a table column), such as high values, low values, mean values, median values, entropy metrics, uniqueness factors, etc. In any case, fingerprints for new proposed features can be compared with those already in the communication network database system 240 to identify potential duplicates. For instance, the comparison may be quantified via a calculation of a distance metric (e.g., a similarity and/or different metric) between the fingerprints. In one example, the thesaurus/ontology 245 may represent synonyms and/or antonyms in a knowledge graph, e.g., without additional domain knowledge embedded in the edges and other nodes, for example. In this regard, a thesaurus may be considered a subset, or sub-graph of an ontological graph as described above. In one example, the generative MLM-based communication network knowledge platform may maintain the thesaurus/ontology 245 via machine learning feedback as described in greater detail below.

In any case, the generative MLM-based communication network knowledge platform may utilize the mapping table and/or the thesaurus/ontology 245 (more generally or collectively referred to a mapping function) to revise the NL request 210 into a prompt 230 having a format that is more likely to solicit an optimized result from a generative MLM. For instance, in the example of FIG. 2, the NL request 210 may be "Show me distinct host for the first 100 records with pie chart." The automatically generated prompt 230 may then be "show me distinct raw_records:tags:host for the first 100 records with pie chart." Next, the automatically generated prompt 230 may be applied as an input/prompt to the generative MLM 250. The generative MLM 250 may comprise, for example, a large language model (LLM). For instance, the generative MLM 250 may comprise a generative pre-trained transformer (GPT) model, a Large Language Model Meta AI (LLaMA) model, a Language Model for Dialogue Applications (LaMDA) model, a Pathways Language Model (PaLM) model, a bidirectional transformer that is pre-trained for language understanding/natural language processing (NLP) tasks (e.g., a Bidirectional Encoder Representations from Transformers (BERT) model), and so forth. In one example, the generative MLM 250 may include a mixture of experts or ensemble of multiple base MLMs.

In one example, different MLMs may be possessed by the generative MLM-based communication network knowledge platform, where based on the accuracy/quality of the response/output, these MLMs can be reconfigured/retrained in an adaptive way. As such, in one example, the generative MLM 250 may comprise one or more MLMs that are selected via an auto-ML process. For instance, an operator may provide optimization criteria to obtain the best performing model with respect to accuracy, speed, a combination of such factors, etc. In addition, in one example, the generative MLM 250 may be adapted from a pre-trained model, where the framework of the generative MLM-based communication network knowledge platform may be used to modify and retune the adopted model(s). Thus, it should be noted that training of the generative MLM 250 can be accomplished in different ways such as training from scratch, fine-tuning of a pre-trained model, retrieval-augmented generation (RAG), reinforcement learning using feedback, prompting/prompt-tuning, learning using adapters, a combination of any of the foregoing, and so forth.

In one example, in accordance with the present disclosure, a retrieval augmented generation (RAG) process may be implemented when inputting the prompt 230 to the generative MLM 250. For instance, domain knowledge may be embedded in the prompt 230 or provided along with the prompt 230. For instance, this may comprise vectorized table column and/or field labels of the data tables 240, and/or the thesaurus/ontology 245. In one example, a selection from the thesaurus/ontology 245 may be used, e.g., a subgraph associated with one or more nodes representing one or more mapped terms, e.g., along with edges and one-hop associated nodes, two-hop associated nodes, etc. Notably, this supplemental prompt input data may bias the generative MLM 250 to be more likely to generate a focused structured query 260, e.g., which is more likely to result in the retrieval of the relevant/correct data from data tables 249 as the query result 270. In one example, a portion of the prompt 230 relating to visualization may be truncated from the prompt 230 before submission as input to the generative MLM 250 (e.g., the end of the prompt 230 " . . . with pie chart"). In one example, each prompt, such as prompt 230, input to the generative MLM 250 may be preceded by standardized prompt content and/or may be inserted into a prompt template, such as "generate an SQL query for the request: _____." For instance, in the example illustrated in FIG. 2, the blank may be filled with "show me distinct raw_records:tags:host for the first 100 records."

The generative MLM 250 may generate a structured query 260 in response to the prompt 230 as input (and in one example, along with supplemental input(s), such as RAG content, as described above). For instance, in response to the prompt 230 "show me distinct raw_records:tags:host for the first 100 records with pie chart" (or "show me distinct raw_records:tags:host for the first 100 records" and/or "generate an SQL query for the request: show me distinct raw_records:tags:host for the first 100 records"), the generative MLM 250 may generate the structured query 260, such as "select distinct raw_record:tags:host from eri_cm-me_raw limit 100"). Next, the structured query 260 may be applied to the communication network database system 240 (e.g., to the data tables 249 thereof), to obtain the query result 270. For instance, the query result 270 may comprise a result table, e.g., containing data extracted from data tables 249 and in some case combined or otherwise modified via operations, such as union, join, merge, etc.

Lastly, the generative MLM-based communication network knowledge platform may generate a visualization 280 to present the query result 270. For instance, in various examples, the visualization 280 may comprise a bar graph, a pie graph/chart, a line graph, etc. In another example, the visualization 280 may comprise the query results 270 in table format. In various examples, the visualization 280 may be presented via a display screen of a user's computing device, as a print-out via a printer, and so forth. In the particular example illustrated in FIG. 2, the visualization may comprise a pie chart in accordance with the original NL request 210. In one example, the generative MLM-based communication network knowledge platform may include a component for generating visualization. In another example, generative MLM-based communication network knowledge platform may instruct (e.g., via an application programming interface (API) or the like) another platform, application, program, or the like that generates data visualizations from input data, such as the query result 270 in result table format.

To improve the accuracy and/or other performance aspects of the generative MLM-based communication network knowledge platform, in one example feedback 290 (e.g., from a user or other automated systems) may be applied to the generative MLM 250. For instance, a user may submit the NL request 210. The generative MLM-based communication network knowledge platform may then retrieve the query result 270, and provide the output (e.g., visualization 280). The user may then provide feedback 290, e.g., comprising an indication that the query result 270 and/or visualization 280 is correct, incorrect, sufficient, insufficient, etc. The generative MLM-based communication network knowledge platform may then utilize the feedback 290, e.g., as labels to retrain the generative MLM 250. Alternatively, or in addition, the generative MLM-based communication network knowledge platform may utilize feedback 290 to update the mapping function (e.g., a mapping table and/or thesaurus/ontology 245) over time to determine which NL terms should be mapped to which other terms that should be used in generating the mapped prompt 230.

In addition, it should be realized that the process 200 may be implemented in a different form than that illustrated in FIG. 2, or may be expanded or modified by including additional or different stages/operations, omitting stages/operations, etc. Similarly, in other examples, the process 200 may apply to other types of data, e.g., structured and unstructured data stored in communication network database system 240, e.g., non-SQL datasets (or "no-SQL"), data stored in data graph form, and so forth, weather data, retail data, vehicular traffic data, medical data, epidemiological data, and so on. Furthermore, although examples of the present disclosure are described primarily in connection with SQL database and SQL queries, other examples of the present disclosure may include other query languages that relate to structured and/or unstructured data sets, such as Graph Query Language (GQL), Gremlin, Pipelined Relational Query Language (PRQL), and so forth. Thus, these and other modifications are all contemplated within the scope of the present disclosure.

FIG. 3 illustrates an example user interface (UI) 300, e.g., a graphical user interface (GUI) for automated structured query generation and output visualization in accordance with the present disclosure. For instance, as shown in FIG. 3, the example UI 300 may include a field 310 to select a data source. For instance, in the present example, the data source of "Snowflake" may be selected. In various examples, field 310 may comprise a fillable field, a drop-down menu, and so forth. In one example, the UI 300 may present sample prompts, e.g., in region/box 320. For instance, the sample prompts may be provided by a system designer and may appear in response to the selection of the data source. For instance, different sample prompts may be presented to the user for different selected data sources. Alternatively, or in addition, different sample prompts may be suggested to different users, e.g., based upon the user's past requests/prompts, based upon the user's identity or role, e.g., within an organizational structure for communication network operations personnel, and so forth. In the present example, the UI 300 further includes a box/field 330 for the user's current prompt/request, e.g., "your prompt:" indicates that the user has provided the following prompt: "Show me distinct application ID for timeframe between May 1, 2024 and May 20, 2024 with pie chart."

The UI 300 may further include a box/region 340 to present the structured query (e.g., an SQL query) generated based upon the user's prompt/request. For instance, in the example illustrated in FIG. 3, the automatically generated SQL query may be: "select distinct raw_record:tags:appli-cationID from eri_cmme_raw where sf_load_ts_utc between '2024 May 1 00:00:00' and '2024 May 30 00:00:00'." In addition, this box/region 340 may further provide summary data regarding the query results, e.g., "total records of query result: 5." An additional node of "only show first 10 records" is also included. However, this is not applicable in the present example because the number of records returned is only five. Below this box/region 340 may be a result of the SQL query, e.g., a query result or query table 350, which includes five records as shown.

Moreover, the UI 300 may further include an output visualization 360, e.g., in this case in the form of a pie chart/graph. In particular, the pie chart/graph is divided into five regions corresponding to the five records in the query result. For instance, the relative proportions of each of the five sections in the pie chart/graph may correspond to the number of records indicating each of five distinct hosts in the first 100 records, as originally requested in the natural language request/prompt. In addition, in the present example, the actual instruction that is used to render the pie chart/graph is further presented for user reference, e.g., "answer:df['raw_record:tags:applicationID'], value_counts( ), plot(kind='pie')<|IM_END|>." It should be noted that FIG. 3 illustrates just one example of a user interface 300 in accordance with the present disclosure. As such, other, further, and different example user interfaces of the present disclosure may have a different form and may include, more, less, or different features form the UI 300. For instance, the SQL query result of box/region 340 may be omitted, the result table 350 may be omitted, the output visualization rendering instruction may be omitted, etc. For instance, the output may be the output visualization 360, where the UI 300 may provide options for a user to see additional information, such as the result table 350 upon which the output visualization is based, by selecting/clicking to have such information presented in a pop-up window, on a different screen, and so forth. Thus, these and other modifications are all contemplated within the scope of the present disclosure.

FIG. 4 illustrates a flowchart of an example method 400 for presenting a visualization of a query result obtained in response to an input prompt generated from a natural language request in accordance with a prompt mapping function. In one example, steps, functions, and/or operations of the method 400 may be performed by a device as illustrated in FIG. 1, e.g., one or more of the servers 135, or the like, such as generative MLM-based communication network knowledge platform. Alternatively, or in addition, the steps, functions and/or operations of the method 400 may be performed by a processing system collectively compris-ing a plurality of devices as illustrated in FIG. 1 such as one or more of the servers 135, DB(s) 136, endpoint devices 111-113 and/or 121-123 (e.g., user equipment (UE), or the like), and so forth. In one example, the steps, functions, or operations of method 400 may be performed by a computing device or system 500, and/or a processing system 502 as described in connection with FIG. 5 below. For instance, the computing device 500 may represent at least a portion of a platform, a server, a system, and so forth, in accordance with the present disclosure. For illustrative purposes, the method 400 is described in greater detail below in connection with an example performed by a processing system. The method 400 begins in step 405 and proceeds to step 410.

At step 410, the processing system obtains a natural language request associated with a database system. For instance, the database system may comprise data tables of communication network operational data, as described above. In addition, in one example, the processing system may be deployed in the communication network. In one example, the database system may comprise a structure query language (SQL)-based system. It should also be noted that in one example, the NL request may also include a visualization request, e.g., for a pie chart, a bar graph, etc. For instance, an example, NL request may be: "Show me distinct host for the first 100 records with pie chart."

At step 420, the processing system generates a prompt based upon the natural language request in accordance with a prompt mapping function. For instance, in one example, the prompt mapping function may comprise a term mapping function that matches terms in natural language requests to data fields of data tables of the database system. For instance, the data fields may comprise at least one of: table columns, or fields of data elements within a table column. To further illustrate, as noted above, the data elements may comprise JSON elements (e.g., and where the fields may comprise JSON fields). Alternatively, or in addition, the prompt mapping function may comprise a thesaurus/con-trolled vocabulary and/or an ontology. In one example, such a thesaurus and/or ontology may be maintained as a graph, or graph database. In one example, the term mapping function may be updated via machine learning. For instance, as described above, feedback from users may be obtained to indicate whether search results are corrected in accordance with the intents of the respective natural language requests, which may be used as positive and negative examples for ongoing learning and/or periodic retraining.

In one example, an output of the prompt mapping function may be inserted into a prompt template to finalize the prompt for use in step 430. For instance, standardized prompt content may be prepended or appended and/or the output of the prompt mapping function may be inserted into a prompt template, such as "generate an SQL query for the request: _____." For instance, the output of the prompt mapping function may be: "show me distinct raw_records: tags:host for the first 100 records", which may be inserted into the template "generate an SQL query for the request: _____." In such an example, the final prompt may be: "generate an SQL query for the request: show me distinct raw_records:tags:host for the first 100 records." Similarly, in an example in which a portion of the prompt relates to visualization, this portion may be truncated from the output of the prompt mapping function before submission as input to a generative model at step 430.

At step 430, the processing system applies the prompt as an input to a generative model to generate a structured query. In one example, the generative model may be implemented by the processing system. In other words, the instructions/code of the algorithm of the generative model may be executed by the processing system. In various examples, and as discussed above, the generative model may comprise a language model, e.g., an LLM. For instance, an ML-based generative model used in the present examples may com-prise a GAN, a BERT model, a GPT model, and SGPT model, a LLaMA model, a LaMDA model, a PaLM model, and so forth. In one example, step 430 may include gener-ating supplemental prompt content from one or more data tables of the database system and applying the supplemental prompt content as an additional input to the generative model. For instance, step 430 may include a retrieval augmented generation (RAG) process. For example, supple-mental prompt content may include data derived from the data tables of the database system, such as the thesaurus/ontology, column and/or field labels, or the like. Supple-mental prompt content may also include domain knowledge, such as vectorized representations of white papers or other technical documents, textbooks, etc. Supplemental prompt content may also include specific documentation relating to SQL queries (or other query languages). For example, official descriptions of language commands, syntax, etc., sample queries, and so forth may be included as supplemen-tal prompt content (and/or vectorized and included as supplemental prompt content). In any case, the output of the generative model may be a fully formed structured query, e.g., an SQL query, or the like.

At step 440, the processing system applies the structured query to the database system to obtain a query result. In one example, the processing system may further comprise the database system such that it processes/executes the struc-tured query over one or more data tables in the database system to generate the query result. In one example, the query result may comprise a result table, such as result table 300 of FIG. 3, or the like.

At optional step 450, the processing system generates at least one visualization of the query result. For instance, the at least one visualization may comprise one or more charts and/or one or more graphs, or the like. Alternatively, or in addition, the at least one visualization may comprise at least one result table. In still another example, the at least one visualization may alternatively or additionally comprise an animation, e.g., showing changes over time for one or more fields/columns of a result table, and so forth. As noted above, in one example, the natural language request may include a visualization request. Accordingly, in one example, optional step 450 may include generating the at least one visualiza-tion based upon the request, e.g., whether a bar graph is request, whether a pie chart is requested, etc. In one example, optional step 450 may include generating an instruction that is used to render the visualization, such as, illustrated in FIG. 3, or the like. For instance, the instruction may be in accordance with an API of a visualization rendering component (e.g., part of the processing system or external to the processing system).

At step 460, the processing system presents a visualization of the query result. For instance, step 460 may include presenting the visualization via a user interface (e.g., a GUI) that is used to submit the NL request at step 410. For instance, the visualization may be via a UI, such as UI 300 illustrated in FIG. 3 and described above. In one example, step 460 may include transmitting a file content of the visualization to a user device for presentation on a display screen. Following step 460, the method 400 ends in step 495.

It should be noted that method 400 may be expanded to include additional steps, or may be modified to replace steps with different steps, to combine steps, to omit steps, to perform steps in a different order, and so forth. For instance, in one example, the processing system may repeat one or more steps of the method 400, such as steps 410-460 for new NL request(s), steps 440-460 to re-execute the structured query and to obtain an updated result based upon new data that may be populated into one or more data tables of the database system, and so forth. In one example, the method 400 may include providing suggested NL requests/prompts prior to obtaining the NL request at step 410. In one example, the method 400 may include storing NL requests, prompts, and/or structured queries, e.g., along with query results for fast re-access. In one example, the method 400 may further include obtaining a selection of the database system, e.g., from among a plurality of available database systems. In one example, the method 400 may include obtaining feedback and retraining the prompt mapping function and/or the generative model. Alternatively, or in addition, the method 400 may include other pre- or post-processing operations, such as ETL operations, data cleansing, sanitizing, averaging, etc. In another example, the database system may include, e.g., non-SQL datasets (or "no-SQL"), data stored in data graph form, and so forth, weather data, retail data, vehicular traffic data, medical data, epidemiological data, and so on. In one example, the method 400 may be expanded or modified to include steps, functions, and/or operations, or other features described above in connection with the example(s) of FIGS. 1-3, or as described elsewhere herein. Thus, these and other modifications are all contemplated within the scope of the present disclosure.

In addition, although not specifically specified, one or more steps, functions, or operations of the method 400 may include a storing, displaying, and/or outputting step as required for a particular application. In other words, any data, records, fields, and/or intermediate results discussed in the method 400 can be stored, displayed and/or outputted either on the device executing the method 400, or to another device, as required for a particular application. Furthermore, steps, blocks, functions, or operations in FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 500 may comprise optional steps, or can be combined, separated, and/or performed in a different order from that described above, without departing from the examples of the present disclosure.

Figure 5:
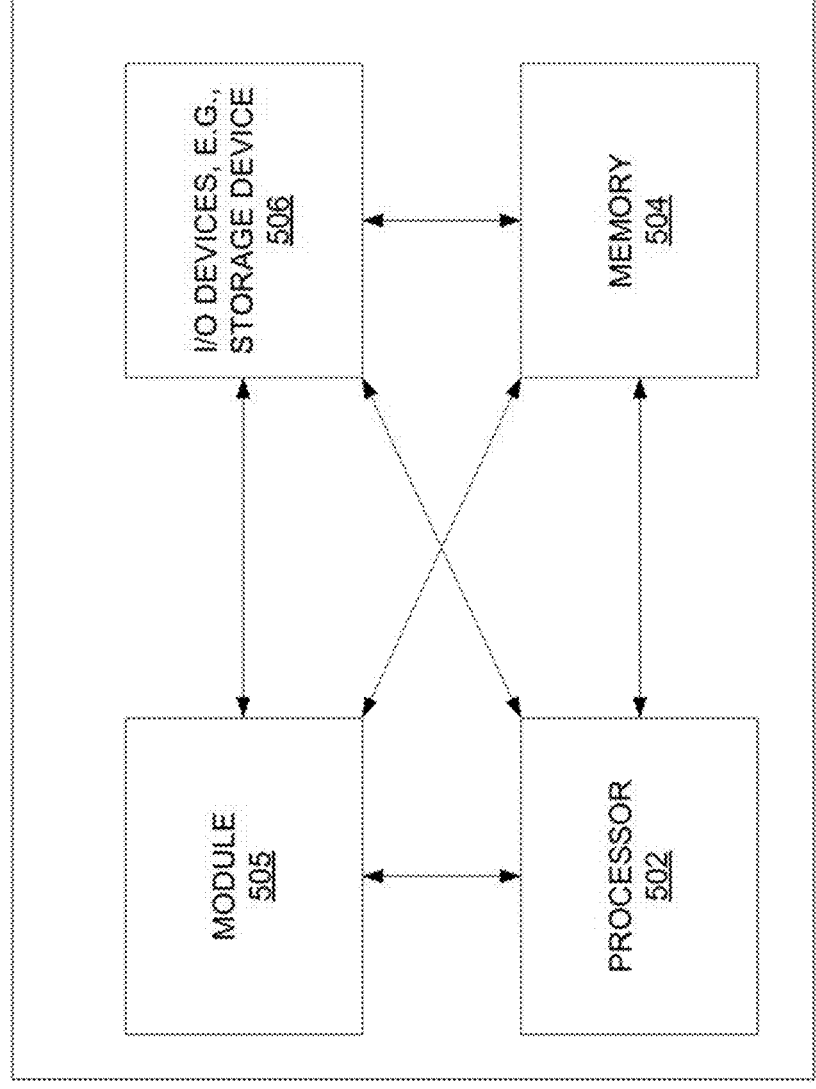
FIG. 5 illustrates a high-level block diagram of a computing device specially programmed to perform the functions described herein.

FIG. 5 depicts a high-level block diagram of a computing device or processing system specifically programmed to perform the functions described herein. For example, any one or more components or devices illustrated in FIGS. 1 and 2, or described in connection with the examples of FIGS. 3 and 4 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for presenting a visualization of a query result obtained in response to an input prompt generated from a natural language request in accordance with a prompt mapping function, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in FIG. 5, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 5 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for presenting a visualization of a query result obtained in response to an input prompt generated from a natural language request in accordance with a prompt mapping function (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for presenting a visualization of a query result obtained in response to an input prompt generated from a natural language request in accordance with a prompt mapping function (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a natural language request associated with a database system;
generating, by the processing system, a prompt based upon the natural language request in accordance with a prompt mapping function, wherein the prompt mapping function comprises a term mapping function that matches terms in natural language requests to data fields of data tables of the database system, wherein the term mapping function comprises: a thesaurus or an ontology, and wherein the thesaurus or the ontology comprises a feature graph that includes: nodes and edges, each of the nodes representing a respective one of the data fields of the data tables of the database system and each of the edges representing a respective pair of the data fields of the data tables of the database system being related, and wherein the generating of the prompt includes: generating an output of the prompt mapping function in response to the natural language request as an input, truncating, from the output, a portion of the output that relates to visualization to generate a truncated output, and generating the prompt by inserting the truncated output into a prompt template;
applying, by the processing system, the prompt as an input to a generative model implemented by the processing system to generate a structured query, wherein the applying includes embedding a sub-graph of the thesaurus or the ontology with the prompt as the input to the generative model;
applying, by the processing system, the structured query to the database system to obtain a query result; and
presenting, by the processing system, at least one visualization of the query result.

2. The method of claim 1, further comprising:
generating the at least one visualization of the query result.

3. The method of claim 2, wherein the at least one visualization of the query comprises at least one result table.

4. The method of claim 2, wherein the at least one visualization comprises at least one of:
a chart; or
a graph.

5. The method of claim 2, wherein the natural language request includes a visualization request.

6. The method of claim 5, wherein the at least one visualization of the query result is generated in response to the visualization request.

7. The method of claim 1, wherein the database system comprises data tables of communication network operational data.

8. The method of claim 7, wherein the processing system is deployed in a communication network.

9. The method of claim 1, wherein the generative model comprises a large language model-based machine learning model.

10. The method of claim 1, wherein the generative model comprises a generative pre-trained transformer model.

11. The method of claim 1, wherein the applying of the prompt as the input to the generative model to generate the structured query further comprises:
generating supplemental prompt content from one or more data tables of the database system; and
applying the supplemental prompt content as an additional input to the generative model.

12. The method of claim 1, wherein the data fields comprise at least one of:
table columns; or
fields of data elements within a table column.

13. The method of claim 12, wherein the data elements comprise java script object notation elements.

14. The method of claim 1, wherein the term mapping function is updated via machine learning.

15. The method of claim 1, wherein the database system comprises a structured query language-based system.

16. A non-transitory computer-readable medium storing instructions which, when executed by a processing system including at least one processor, cause the processing system to perform operations, the operations comprising:
obtaining a natural language request associated with a database system;
generating a prompt based upon the natural language request in accordance with a prompt mapping function, wherein the prompt mapping function comprises a term mapping function that matches terms in natural language requests to data fields of data tables of the database system, wherein the term mapping function comprises: a thesaurus or an ontology, and wherein the thesaurus or the ontology comprises a feature graph that includes: nodes and edges, each of the nodes representing a respective one of the data fields of the data tables of the database system and each of the edges representing a respective pair of the data fields of the data tables of the database system being related, and wherein the generating of the prompt includes: generating an output of the prompt mapping function in response to the natural language request as an input, truncating, from the output, a portion of the output that relates to visualization to generate a truncated output, and generating the prompt by inserting the truncated output into a prompt template;
applying the prompt as an input to a generative model implemented by the processing system to generate a structured query, wherein the applying includes embedding a sub-graph of the thesaurus or the ontology with the prompt as the input to the generative model;

applying the structured query to the database system to obtain a query result; and presenting at least one visualization of the query result.

17. An apparatus comprising:

a processing system including at least one processor; and a computer-readable medium storing instructions which, when executed by the processing system, cause the processing system to perform operations, the operations comprising:

obtaining a natural language request associated with a database system;

generating a prompt based upon the natural language request in accordance with a prompt mapping function, wherein the prompt mapping function comprises a term mapping function that matches terms in natural language requests to data fields of data tables of the database system, wherein the term mapping function comprises: a thesaurus or an ontology, and wherein the thesaurus or the ontology comprises a feature graph that includes: nodes and edges, each of the nodes representing a respective one of the data fields of the data tables of the database system and each of the edges representing a respective pair of the data fields of the data tables of the database system being related, and wherein the generating of the prompt includes: generating an output of the prompt mapping function in response to the natural language request as an input, truncating, from the output, a portion of the output that relates to visualization to generate a truncated output, and generating the prompt by inserting the truncated output into a prompt template;

applying the prompt as an input to a generative model implemented by the processing system to generate a structured query;

applying the structured query to the database system to obtain a query result, wherein the applying includes embedding a sub-graph of the thesaurus or the ontology with the prompt as the input to the generative model; and presenting at least one visualization of the query result.

18. The apparatus of claim 17, wherein the operations further comprise:

generating the at least one visualization of the query result.

19. The apparatus of claim 18, wherein the at least one visualization of the query comprises at least one result table.

20. The apparatus of claim 18, wherein the at least one visualization comprises at least one of:

a chart; or a graph.

* * * * *